UNITED STATES PATENT OFFICE.

HECTOR M. SINCLAIR, OF OKLAHOMA, OKLAHOMA.

COMPOUND.

No. 931,094.  Specification of Letters Patent.  Patented Aug. 17, 1909.

Application filed September 22, 1908. Serial No. 454,202.

*To all whom it may concern:*

Be it known that I, HECTOR M. SINCLAIR, a citizen of the United States, residing at Oklahoma city, in the county of Oklahoma and State of Oklahoma, have invented certain new and useful Improvements in Compounds, of which the following is a specification.

This invention relates to cement principally designed for metal joints and which may be used for repairing of all kinds of metal roofing, water tanks, troughs, repairing and setting skylight glasses, packing joints of pipes and wherever cement is required to close cracks, joints, or openings, in work of any nature, the cement being such as not to be affected by climatic changes, such as heat, cold, damp or dry weather.

In preparing about eight gallons of cement, the following ingredients are combined in about the proportions specified, viz: To six (6) gallons of pure distilled coal tar, which is heated, add:—

One quart of pure asphaltum varnish,
12 pounds of asbestos fiber, (medium grade)
3 " " graphite, (air floated Mexican)
3 " " ground mica,
8 ounces " dry lamp black,
4 " " mineral (Venetian red)
4 " " yellow ocher,
8 " " pulverized alum,
1 " " red rosin pulverized,
1 ounce " bi-carbonate soda,
1 " " sal soda,
½ " " hyposulfite of soda,
½ " " table salt.

The ingredients are combined by agitation, a mill, or mixing machine, of suitable make, being employed to effect a thorough blending of the constituents to insure the provision of a homogeneous mass.

The coal tar enables the cement to be spread and insures its clinging and adhering to the parts to be repaired. The asphaltum likewise adds to the spreading quality of the cement, keeps same from drying out too quickly and renders the same elastic and durable. The asbestos fiber enables the cement to withstand heat, adds to the compactness of the body, preventing same from cracking, checking or peeling, besides adding to the durability of the product. The graphite, lamp black, mineral and yellow ocher produce a body of ingredients that adds to compactness, filling up any places that the fiber does not get and adds to the durability thereof. The mica gives a slick surface and renders the cement pliable so as to be easily spread as well as increasing the heat resisting qualities. It also adds to the compactness with above item. The alum and rosin cut the coal tar and asphaltum and make the cement quick setting as well as adding to the body and causing the cement to adhere more firmly to the surface or joint to which it may be applied. The bi-carbonate soda, sal soda, hypo-sulfite of soda and salt are preservatives against climatic changes and prevent the cement from checking and cracking.

The compound proper as herein stated is homogeneous, spreads easy, resists climatic changes and is well adapted to undergo chemical change when applied so as to produce a cement that will practically combine with the parts to which applied and thereby produce a firm, substantial and tight joint.

The graphite, lamp black, Venetian red and yellow ocher are used to give body to the cement. When taken collectively these ingredients result in a compact body. The asbestos being fibrous naturally tends to form minute spaces into which moisture is liable to penetrate. The addition of the ingredients just mentioned wholly overcomes this objection and insures the formation of a product which is practically impervious to moisture. The lamp black is essential and results in the formation of a body possessing a fine texture or quality and also gives to the body a deep color, which adds materially to its attractiveness. Commercially rosin is supplied, some being a rich yellow color and other a red hue. It has been found that for some unknown reason the red rosin gives better results than the ordinary yellow rosin, hence is preferred. The rosin increases the adhesiveness of the cement particularly when used for repairing around chimneys, troughs and shingle roofs. The hypo-sulfite, bi-carbonate and sal-sodas and salt are used as preservatives to counteract the effect of climatic changes upon the other ingredients. In practice it has been ascertained that the cement when used on a roof which is exposed to a long dry spell, the several sodas and salt keep the cement from drying too quickly and prevent its checking and cracking. The bi-carbonate of soda prevents the cement from becoming soft during a rainy spell or when used on joints of pipe coming in contact with steam. To dispense with any one of the sodas or salt results in an impairment of the cement, said beneficial results being had by employing these ingredients in the proportions about specified.

Having thus described the invention, what is claimed as new is:

The herein described cement comprising coal tar, asphaltum varnish, Venetian red, lamp black, graphite, yellow ocher, mica, rosin, alum, bi-carbonate, sal and hyposulfite of soda and salt in about the proportions specified.

In testimony whereof I affix my signature in presence of two witnesses.

HECTOR M. SINCLAIR. [L. S.]

Witnesses:
  I. N. PHILLIPS,
  S. C. DAVIS.